United States Patent [19]

Nagashima

[11] 3,752,565
[45] Aug. 14, 1973

[54] ZOOM LENS APPARATUS
[75] Inventor: Motoi Nagashima, Tokyo, Japan
[73] Assignee: Shima Kogaku Kabushiki Kaisha, Tokyo, Japan
[22] Filed: Feb. 18, 1972
[21] Appl. No.: 227,530

[52] U.S. Cl.................. 350/255, 350/184, 350/187
[51] Int. Cl. ............................................. G02b 7/02
[58] Field of Search.................... 350/184, 186, 187, 350/255

[56] References Cited
UNITED STATES PATENTS
3,455,628  7/1969  Back .................................... 350/187
3,663,093  5/1972  Iida ..................................... 350/255
2,902,901  9/1959  Back .................................... 350/255
3,090,282  5/1963  Angenieux ........................... 350/255

Primary Examiner—David Schonberg
Assistant Examiner—Michael J. Tokar
Attorney—Cushman, Darby & Cushman

[57] ABSTRACT

A zoom lens apparatus comprising an actuating ring adapted to be rotated integrally with a zooming ring, and a first, a second and a third lens group which are caused to move in the direction of the optical axis independently of each other as said actuating ring is rotated, and being operative so that the focal distance may be progressively altered continuously without causing any aberration and/or marginal blurring throughout the range from the extreme wide angle to the telephoto position by the mere rotation of said single actuating ring.

5 Claims, 3 Drawing Figures

ZOOM LENS APPARATUS

BACKGROUND OF THE INVENTION

1. Field of the Invention

The present invention is concerned with a zoom lens apparatus for use in a photographic camera, and more particularly, it pertains to a zooming mechanism which is capable of causing a plurality of groups of lens elements to move forwardly and backwardly for a required amount respectively by the mere rotation of a single actuating ring.

2. Description of the Prior Art:

A lens system which is used in a photographic camera, in general, is comprised of a plural number of groups of lens elements. It is usual that the complexity of this lens arrangement increases for articles of higher grades. In particular, in a zoom lens which is designed so that a single train of lenses is usable for a focus ranging from the extreme wide angle to the exreme telephoto position, not only the lens system becomes markedly complicated but also there arises the necessity that the respective groups of lens elements have to be moved forwardly and backwardly respectively. Hence, conventional zoom lenses had the drawback that their overall size tended to become bulky with the accompaniment of an increase in their weight and that, accordingly, they were inconvenient to carry. Furthermore, conventional zoom lenses were arranged so that two groups of lens elements were caused to move by a zooming operation, with the result that their zooming range was inevitably narrow and that many of them had the troubles of developing aberration and margin blurring.

SUMMARY OF THE INVENTION

It is, therefore, a primary object of the present invention to provide a zoom lens apparatus arranged so that three groups of lens elements are caused to move forwardly and backwardly in the direction of the optical axis for required amounts respectively, as a single ring is rotated, and operative so that the synthesized focal distance of the respective lens elements can be altered arbitrarily in the range from the extreme wide angle to the extreme telephoto position.

Another object of the present invention is to provide a zoom lens apparatus arranged so that, whenever it is carried, it can have an extremely reduced length.

Still another object of the present invention is to provide a highly efficient zoom lens apparatus which gives rise to no problems such as aberration and marginal blurring throughout the range from the extreme wide angle to the extreme telephoto position.

Other objects as well as the attendant advantages of the present invention will become apparent from the following detailed description of the preferred embodiments when taken in conjunction with the accompanying drawings.

DESCRIPTION OF THE PREFERRED EMBODIMENTS

Figure 1:
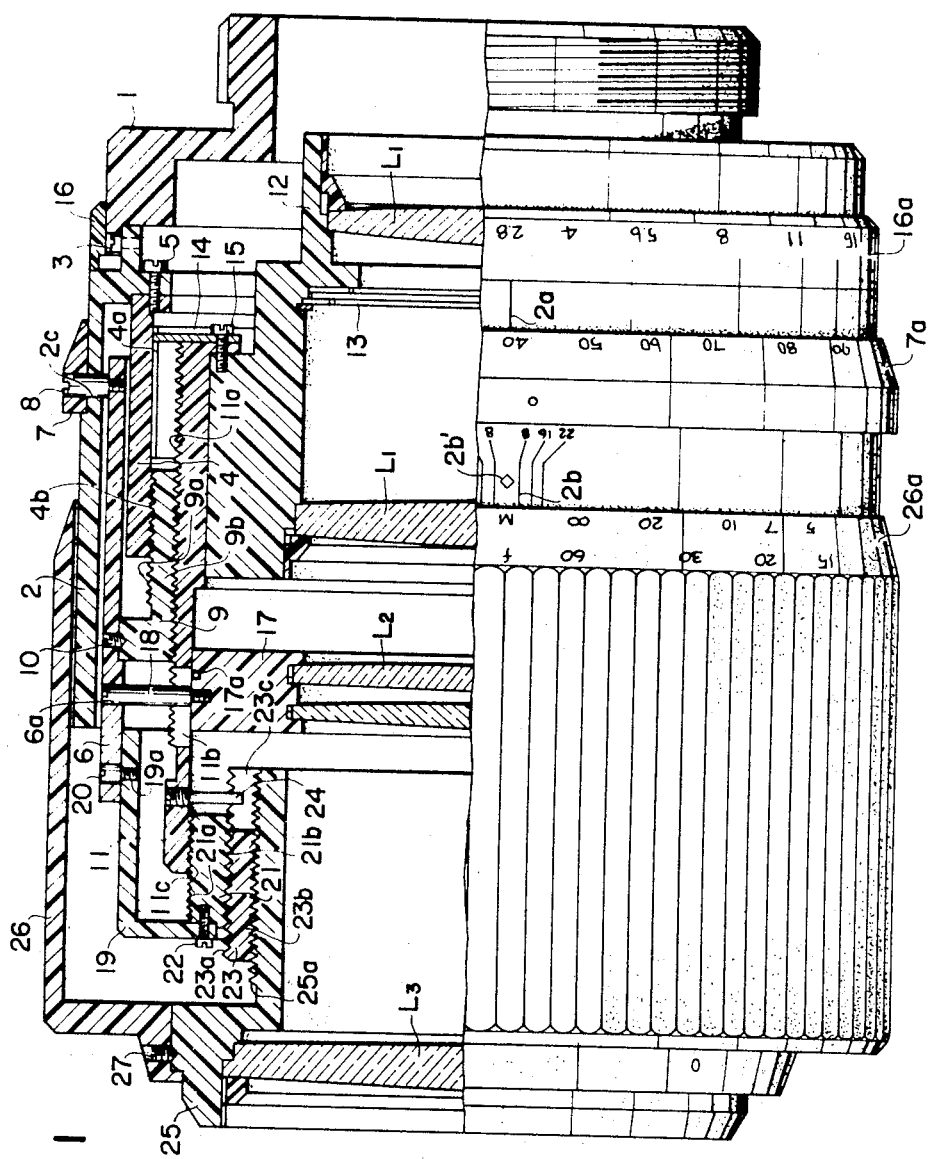
FIG. 1 is a side elevation of the zoom lens apparatus of the present invention, the upper half of which is in section.
Figure 2:
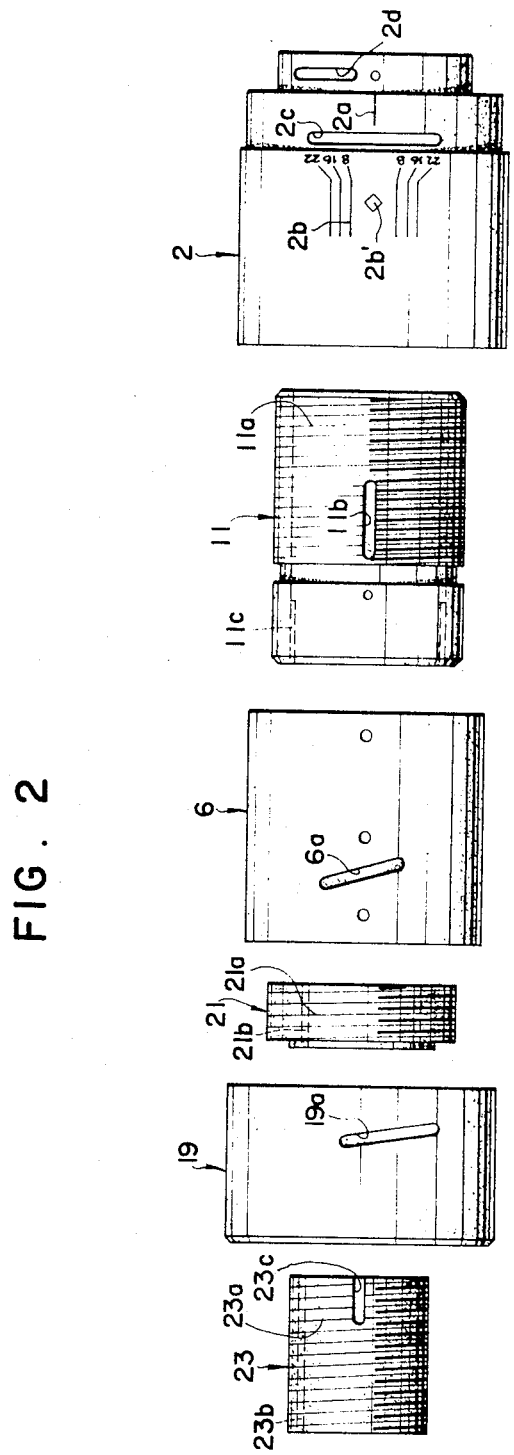
FIG. 2 is a plan view of only the main parts of FIG. 1 in an serially exploded fashion and arranged in the optical axis.

In FIGS. 1 and 2, reference numeral 1 represents a known lens mount which can be detachably attached to a camera body not shown. Numeral 2 represents a ring carrying focal depth-indicating graduations and having fixed indices 2a as well as focal depth-indicating graduations 2b formed on the circumferential surface thereof, and also having slots 2c and 2d formed therethrough in the circumferential direction, and being secured to the lens mount 1 by a screw 3. Numeral 4 represents a guide ring having — on the inner circumferential surface — a groove 4a which extends in the optical axis and a narrow-pitched threaded portion 4b, and being secured by a screw 5 to the ring 2. Numeral 6 represents an actuating ring having, locally in the circumferential wall, a slot 6a inclined relative to the optical axis and being mounted between the ring 2 and the guide ring 4. Numeral 7 represents a zooming ring rotatably mounted on the external side of the ring 2 which carries focal depth-indicating graduations and provided, on its external circumferential surface, with synthesized focal distance-indication graduations 7a for the lens system which, in turn, cooperate with the fixed indices 2a and also coupled integrally to the actuating ring 6 by a pin 8 which is passed through the slot 2c. Numeral 9 represents a first helicoid ring having, on its external circumferential surface, a threaded portion 9a meshing with the threaded portion 4b and also having, on its inner circumference, a helical thread 9b and being coupled integrally to the actuating ring 6 by a screw 10. Numeral 11 represents a second helicoid ring having, on its outer circumference, a helical thread 11a meshing with the helical thread 9b, a slot 11b extending in the direction of the optical axis, and a narrow-pitched threaded portion 11c. Numeral 12 represents a lens holder mounted within the second helicoid ring 11 to hold a first group $L_1$ of lens elements containing a known diaphragm means 13. Numeral 14 represents a coupling strip having one end portion received in the groove 4a and the other end portion coupled integrally to both of the second helicoid ring 11 and the lens holder 12 by a screw 15. Numeral 16 represents a diaphragm adjusting ring rotatably mounted onto the outer side of the lens mount 1 and having, on its outer circumference, diaphragm graduations 16a which cooperate with the fixed indices 2a and being assigned to operate the diaphragm means 13. Numeral 17 represents a lens holder for holding a second group $L_2$ of lens elements, and being slidably received via a metal ball 17a within the second helicoid ring 11. Numeral 18 represents a pin passing through the slots 6a and 11b and being secured to the lens holder 17. Numeral 19 represents a fourth helicoid ring slidably mounted on the inside of the actuating ring 6 and having, in its circumferential wall, a slot 19a which is inclined relative to the optical axis and also having, on the inside of its forward end, a helicoid ring 1 provided, on its outer circumference, with a threaded portion 21a which meshes with the threaded portion 11c and also provided with a helical thread 21b formed on its inner circumference and secured by a screw 22 to the fourth helicoid ring 19. Numeral 23 represents a third helicoid ring having, on its outer circumference, a helical thread 23a which meshes with the helical thread 21b and also having a helical thread 23b formed on its inner circumference and further having a slot 23c having one open end and extending in the direction of the optical axis. Numeral 24 represents a pin secured to the second helicoid ring 11 and having its forward end portion received in the aforesaid slot 23c of the third helicoid ring 23. Numeral 25 represents a lens holder having, locally on its outer circumference, a helical thread 25a which meshes with the helical thread 23b, and being assigned to hold a third group $L_3$ of lens elements. Numeral 26 represents a focusing ring mounted on the outer side of the ring 2 and coupled integrally by a screw 27 to the lens holder 25 and provided, locally on its external circumference, with distance graduations 26a which cooperate with the central index 2 b' of the focal depth-indicationg graduations 2b.

Description will hereunder be made on the actions of the aforesaid apparatus. It should be understood that the description of these actions is based on the assumption that the directions of the respective threaded portions and of the helical threads are both selected in such a way that, when the zooming ring 7 is rotated clockwise as viewed from the right side of the drawing, both the second helicoid ring 11 and the lens holder 25 are caused to move towards the left side at their positions shown in FIG. 1. By rotating the zooming ring 7 clockwise in its position of FIG. 1, the actuating ring 6 will rotate also in the same direction. In this part of operation, the first helicoid ring 9 rotates clockwise also. However, the second helicoid ring 11 is inhibited of its rotation because the coupling strip 14 is received in the groove 4a which is formed in the guide ring 4. Accordingly, the second helicoid ring 11 is caused to move towards the left side as the first helicoid ring 9 is rotated. As a consequence, the first group $L_1$ of lens elements is caused to move towards the left side along the optical axis. On the other hand, due to the aforsaid rotation of the actuating ring 6, the lens holder 17 is caused to move, via the pin 18 whose movement is limited by the slot 6a which is inclined relative to the optical axis, towards the right side relative to the second helicoid ring 11, whereas the second group $L_2$ of lens elements is caused to move towards the right side relative to the first group $L_1$ of lens elements. Furthermore, by the aforesaid rotation of the actuating ring 6, both the pin 20 and the fourth helicoid ring 19 are rotated also in the aforesaid direction. In this part of operation, however, it should be understood that the direction of inclination and the degree of angle of inclination of the slot 19a formed in the fourth helicoid ring 19 are both selected in such a way that they are in agreement with the orientation and the pitch of the thread of the threaded portion 21a of the helicoid ring 21. In addition, the pin 24 which is secured to the second helicoid ring 11 is received in the slot 23c formed in the direction of the optical axis in the third helicoid ring 23. Therefore, due to the rotary movements of both the fourth helicoid ring 19 and the helicoid ring 21 resulting from the rotation of the actuating ring 6, the third helicoid ring 23 — together with the lens holder 25 — is caused to move towards the left side along the optical axis. As a consequence, the third group $L_3$ of lens elements is caused to make a movement towards the left side along the optical axis relative to the first group $L_1$ of lens elements. Thus, the synthesized focal distance of the lens system which is constituted by the first, second and third groups $L_1$, $L_2$ and $L_3$ of lens elements is prolonged and will provide a lens arrangement having a longer focal distance than that of the lens arrangement in the state shown in FIG. 1.

As will be clear from the foregoing statement, if there is made a theoretical calculation of the changes occurring in the synthesized focal distance due to the relative movements of the respective groups $L_1$, $L_2$ and $L_3$ of lens elements based on such factors as the focal distances and the radii of curvature of those lens elements which constitute the first, second and third groups $L_1$, $L_2$ and $L_3$ of lens elements, respectively, and if the pitches and the orientations of the threads of those helical threads such as 9b, 11a, 21b and 23a as well as such factors as the directions of inclination and the degrees of angle of inclination of the slots 6a and 19a are selected appropriately so that they are in agreement with the result of said calculation, then it is possible to obtain, for example, a photographic zoom lens whose focal distance can be altered in the range from the extreme wide angle to the extreme telephoto position by a same single train of lens elements. It should be understood also that, according to the apparatus of the present invention, by rotating the focusing ring 26, the lens holder 25 alone is caused to move forwardly and backwardly relative to the third helicoid ring 23 in the direction of the optical axis. By virtue of this action of the lens holder 25, it is possible to perform adjustment of the focus on the film face. Also, it is possible to make any arbitrary adjustment of the size of lens diaphragm to obtain a required opening by rotating the diaphragm adjusting ring 16.

Figure 3:
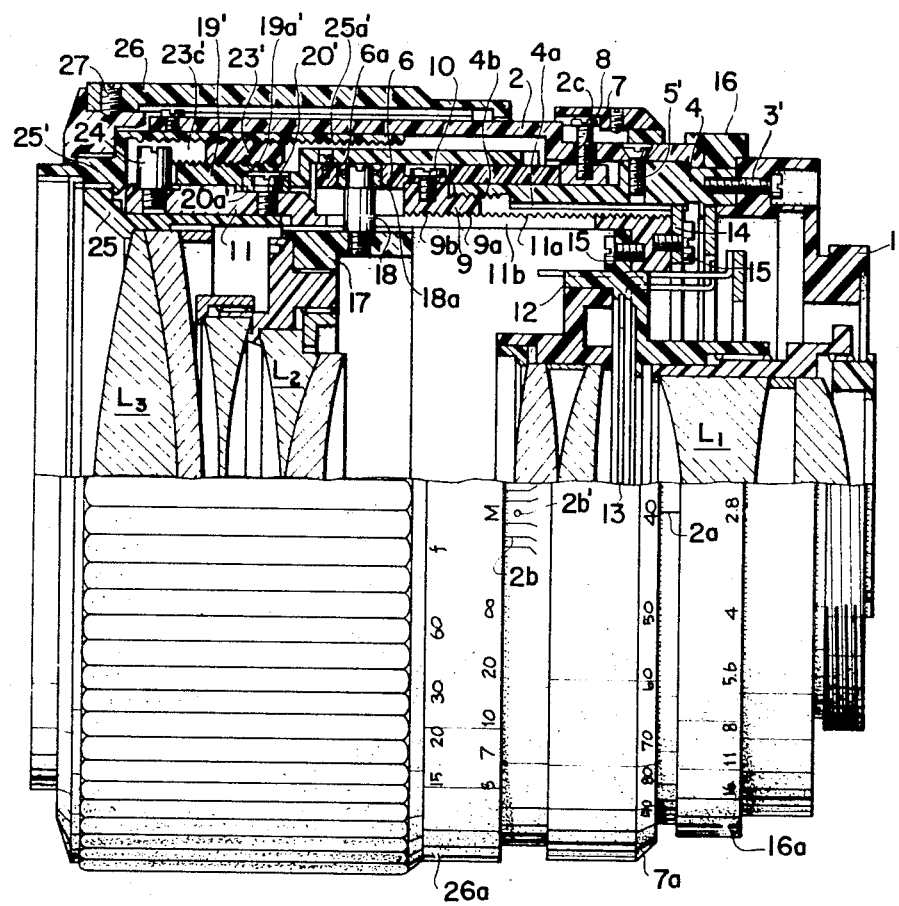
FIG. 3 is a side elevation similar to FIG. 1, showing another example of the zoom lens apparatus of the present invention.

FIG. 3 shows another example having an arrangement somewhat different from that described above. Since, however, this second example is similar in its basic structure to the first one, those parts and sites which are similar to the ones shown in FIG. 1 are indicated by like reference numerals, and parts and sites having the same functions as exerted by those shown in FIG. 1 are indicated by like reference numerals with a prime, and therefore the detailed explanation of the structure and function of such parts and sites is omitted. It should be understood also that, as compared with the arrangement shown in FIG. 1, the example shown in FIG. 3 is given the consideration so that the manufactural processing and the arrangement or combination of the respective parts may be accomplished a little more easily. This instant example shown in FIG. 3 differs from the one shown in FIG. 1 in the following three points, i.e., that the actuating ring 6 is coupled, via a screw 8 threadably attached to the zooming ring 7, to the latter 7; that the fourth helicoid ring 19' is coupled integrally to the actuating ring, and the pin 20' — which is received in the inclined slot 19a' formed in said fourth helicoid ring 19' — is secured to the second helicoid ring 11; and further that the lens holder 25 is secured to an auxiliary ring 25' which is coupled to the focusing ring 26. Also, in this second example, there are given the following considerations that a pin 18 is received, via a roller 18a rotatably mounted on this pin 18, in the slot 6a which is formed in the actuating ring 6, and also that the pin 20' is received, via a roller 20a' rotatably mounted thereon, in the slot 19a' which is formed in the fourth helicoid ring 19', so that the sliding movements of these pins in their mating slots can be performed smoothly.

I claim:

1. A zoom lens apparatus comprising: a mount member; a diaphragm adjusting ring rotatably mounted on said mount member; a ring carrying focal depth-indicating graduations and being secured to said mount member; a focusing ring rotatably mounted on said ring carrying focal depth-indicating graduations; a zooming ring rotatably mounted on the outside of said ring carrying focal depth-indicating graduations; an actuating ring rotatably mounted on the inside of said ring carrying focal depth-indicating graduations and operatively coupled to said zooming ring and provided in its forward end with a first slot inclined relative to the optical axis; a guide ring operatively coupled to said ring carrying focal depth-indicating graduations and provided, in its inner circumferential face, with a groove extending in the direction of the optical axis; a first helicoid ring operatively coupled to said actuating ring and threadably received in said guide ring; a second helicoid ring threadably received in said first helicoid ring and provided, at its forward end, with a second slot extending in the direction of the optical axis and, at its rearward end, with a coupling strip engaging in said groove; a first lens holder operatively coupled to said second helicoid ring; a first group of lens elements mounted on said first lens holder; a second lens holder slidably received in said second helicoid ring; a second group of lens elements mounted on said second lens holder; a first pin secured to said second lens holder and received in said first and second slots; a third lens holder operatively coupled to said focusing ring; a third group of lens elements mounted on said third lens holder; a third helicoid ring threadably received in said third lens holder and provided, at its one end, with a third slot extending in the direction of the optical axis; a seond pin secured to said second helicoid ring and received in said third slot; a fourth helicoid ring threadably receiving said third helicoid ring and provided, at one end portion, with a fourth slot inclined relative to the optical axis; and a third pin received in said second slot and secured to either one of said actuating ring and said second helicoid ring; whereby the apparatus is operative so that, as said zooming ring is rotated, said first, second and third groups of lens elements are caused to move forwardly and backwardly in the direction of the optical axis for required amounts, respectively.

2. A zoom lens apparatus according to claim 1, in which said first group of lens elements contains a diaphragm means operated by said diaphragm adjusting ring.

3. A zoom lens apparatus according to claim 1, in which said first group of lens elements is comprised of two lens elements, said second group of lens elements is comprised of two lens elements, and said third group of lens elements is comprised of one lens element.

4. A zoom lens apparatus according to claim 1, in which said second lens holder is received in said second helicoid ring via a metal ball carried by said second lens holder.

5. A zoom lens apparatus according to claim 1, said first and third pins are received in said first and fourth slots, respectively, via rollers rotatably mounted on these pins, one for each pin.

* * * * *